United States Patent
Manjeshwar et al.

(10) Patent No.: US 7,613,146 B2
(45) Date of Patent: Nov. 3, 2009

(54) METHOD AND SYSTEM FOR RELIABLE DATA TRANSMISSION IN WIRELESS NETWORKS

(75) Inventors: Arati Manjeshwar, Chandler, AZ (US); Lakshmi Venkatraman, Mountain View, CA (US); Bhaskar Srinivasan, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 599 days.

(21) Appl. No.: 11/239,836

(22) Filed: Sep. 30, 2005

(65) Prior Publication Data

US 2007/0076745 A1 Apr. 5, 2007

(51) Int. Cl.
*H04H 20/67* (2008.01)
(52) U.S. Cl. .......... 370/329; 370/343; 370/347
(58) Field of Classification Search .......... 370/332, 370/348, 314, 462, 338, 328, 448, 336, 347, 370/337, 458, 95; 455/456
See application file for complete search history.

(56) References Cited

U.S. PATENT DOCUMENTS

| | | | | |
|---|---|---|---|---|
| 5,553,076 | A * | 9/1996 | Behtash et al. | 370/311 |
| 5,721,733 | A * | 2/1998 | Wang et al. | 370/332 |
| 6,393,007 | B1 * | 5/2002 | Haartsen | 370/337 |
| 7,042,897 | B1 * | 5/2006 | Sivaprakasam et al. | 370/462 |
| 7,103,371 | B1 * | 9/2006 | Liu | 455/456.4 |
| 7,269,152 | B2 * | 9/2007 | Vukovic et al. | 370/332 |
| 7,362,734 | B1 * | 4/2008 | Samaras et al. | 370/336 |
| 2002/0191573 | A1 | 12/2002 | Whitehill | |
| 2004/0160916 | A1 * | 8/2004 | Vukovic et al. | 370/332 |
| 2005/0201340 | A1 | 9/2005 | Wang | |
| 2007/0025390 | A1 * | 2/2007 | Jain | 370/458 |

FOREIGN PATENT DOCUMENTS

| | | |
|---|---|---|
| WO | WO 01/82544 | 11/2001 |
| WO | WO 02/082743 | 10/2002 |

OTHER PUBLICATIONS

European Search Report and Examination for EP 06 02 0093, Date Jan. 24, 2007.

* cited by examiner

*Primary Examiner*—Kwang B Yao
*Assistant Examiner*—Syed Bokhari
(74) *Attorney, Agent, or Firm*—Kenyon & Kenyon LLP

(57) ABSTRACT

A method for transmitting data from a sender node to a receiver node in a wireless network including (a) sampling a main network frequency and at least one backup frequency, (b) transmitting a message on the main network frequency without using a multiple access protocol, (c) transmitting the message on the main network frequency, using the multiple access protocol exchange, if an acknowledgement is not received, (d) transmitting the message on at least one backup frequency, using a multiple access protocol, if the main network frequency is busy after (c), (e) repeating (c) and (d) for a predefined number of time slots, until an acknowledgement is received, (f) transmitting the message on each backup frequency, using the multiple access protocol, until an acknowledgment is received, and (g) performing an exponential backoff and subsequent transmission of the message if an acknowledgement is still not received after (a) through (f).

14 Claims, 4 Drawing Sheets

Time slot for 1 backup frequency

Time slot for 3 backup frequencies

| Iteration Number | Number of slots to chose from | Range for the random number (3 backup frequencies, 1 Network freq) | Range for the random number (1 backup frequency, 1 Network freq) |
|---|---|---|---|
| 1 | 2 | 2*(1+3) = 8 | 2*(1+1) = 4 |
| 2 | 4 | 4*(1+3)=16 | 4*(1+1)=8 |
| 3 | 8 | 8*(1+3)=32 | 8*(1+1)=16 |
| 4 | 16 | 16*(1+3)=64 | 16*(1+1)=32 |
| 5 | 32 | 32*(1+3)=128 | 32*(1+1)=64 |
| 6 | 64 | 64*(1+3)=256 | 64*(1+1)=128 |

Figure 3

METHOD AND SYSTEM FOR RELIABLE DATA TRANSMISSION IN WIRELESS NETWORKS

CROSS REFERENCE TO RELATED APPLICATIONS

This application is related to U.S. patent applications entitled "Method and System for Time Synchronization in Communication Networks" Ser. No. 11/241,298, "Method and System for Providing Acknowledged Broadcast and Multicast Communication" Ser. No. 11/240,401, "Method and System for Providing an Energy Efficient Exchange of Information in Wireless Networks" Ser. No. 11/239,837, "Method and System for Providing Interference Avoidance and Network Coexistence in Wireless Systems" Ser. No. 11/240,545, "Method and System to Reduce Delay and/or Energy Consumption in a Multi-Hop Wireless System" Ser. No. 11/240,434, "Method and System for Providing a Modified Time Division Multiple Access (TDMA) for Reduced Delay" Ser. No. 11/241,639, "Method and System for Providing Reliable Communication with Redundancy for Energy Constrained Wireless Systems" Ser No. 11/241,300, "System and Method for a Communication Protocol for Wireless Sensor Systems Including Systems with High Priority Asynchronous Message and Low Priority Synchronous Message" Ser No. 11/240,436, "Method and System to Reconfigure a Network to Improve Network Lifetime Using Most Reliable Communication Links" Ser. No. 11/241,296. The disclosure of each of the foregoing related applications is hereby incorporated by reference herein in its entirety.

FIELD OF THE INVENTION

The present invention relates to a method and system for reliable data transmission in wireless networks.

BACKGROUND INFORMATION

Wireless security networks, industrial data buses, automotive networks, and many other applications may use wireless communication for transmission of critical high priority messages.

It may be assumed that the wireless medium is error prone (e.g., due to noise and interference) and susceptible to collisions, which may occur when two or more nodes attempt to transmit at the same time. The network may use a Time Division Multiple Access (TDMA) communications protocol and time synchronization may fail.

Multiple channels may be available for transmission. There may be several existing methods to address this problem, such as, for example (a) use of acknowledgements to confirm the delivery of the message; (b) use of Carrier Sense Multiple Access (CSMA) communications protocol and exponential backoff to reduce the chances of collision; and (c) transmission on alternate frequencies or channels to avoid noise and interference.

As wireless networks are used in new applications, techniques for reliable and timely delivery of messages may gain importance. A wireless network may be used, for example, to send fire or burglar alarms from detectors to a central controlling station in homes or offices. In a hospital or old age home, wireless links may be used for devices that send emergency messages. Future automobiles may use wireless communication between sensors and airbags. However, in order for wireless networks to gain increased acceptance, problems like collision, noise, and interference may need to be addressed adequately.

In case of no collisions, the message may need to be communicated with the least latency. If multiple nodes have a message to be sent, the latency for the message increases due to collisions.

There are various methods for providing message delivery in data networks. For example, the Transmission Control Protocol (TCP) communications protocol has been deployed for the Internet for many years. The Transmission Control Protocol (TCP) uses acknowledgements to confirm the delivery of messages. The Carrier Sense Multiple Access (CSMA) communication protocol has been used for Ethernets. According to the Carrier Sense Multiple Access (CSMA) communication protocol, the sender listens on the shared medium and transmits only when the channel is free from other transmissions. The Carrier Sense Multiple Access (CSMA) communication protocol may help in reducing collisions in the network. Ethernets may also use exponential backoff to further reduce the chances of collision. Each time the transmission fails, the sender may use exponential backoff with increased wait intervals.

SUMMARY OF THE INVENTION

An exemplary embodiment and/or exemplary method of the present invention provides reliable data transmission in wireless networks, includes, for example, wireless sensor networks. In this regard, the exemplary embodiment and/or exemplary method of the present invention provides improved coordination between sensors and receivers, using, for example, multiple frequencies, acknowledgements, communications protocol(s), exponential backoff to ensure delivery of messages and reduced delay in wireless transmission.

An exemplary embodiment and/or exemplary method of the present invention may combine use of acknowledgements, the Carrier Sense Multiple Access (CSMA) communication protocol, the Time Division Multiple Access (TDMA) communication protocol, and exponential back off to achieve improved reliability and reduced delay.

An exemplary embodiment and/or exemplary method of the present invention may provide coordination between multiple senders and a receiver using multiple frequencies in order to ensure reliable delivery of message. In this regard, an exemplary embodiment and/or exemplary method of the present invention may increase the chances of successful and quick data transmission between two nodes in a communication network.

The present invention may be suitable, for example, for transmission of high priority messages in wireless networks. For example, in scenarios where a message needs to be communicated with the least latency, or where the latency for the message increases due to collisions, an exemplary embodiment and/or exemplary method of the present invention may ensure that the message from each of the nodes is reliably delivered to the receiver within tolerable time duration.

An exemplary embodiment and/or exemplary method of the present invention is directed to a method for transmitting data from a sender node from among at least one sender node to a receiver node in a wireless network, the method including (a) sampling, by the receiver node, in each time slot, a main network frequency and at least one backup frequency, (b) transmitting, by the sender node, a message on the main network frequency in a first time slot, without using a multiple access protocol, (c) transmitting, by the sender node, the message on the main network frequency in a next time slot, using the multiple access protocol exchange, if an acknowledgement of the message is not received from the receiver node, (d) transmitting, by the sender node, the message on at least one backup frequency in the next time slot, using a multiple access protocol, if the main network frequency is busy after performing step (c), (e) repeating steps (c) and (d) for a predefined number of time slots, unless or until an acknowledgement is received from the receiver node, (f) transmitting, by the sender node, the message on each backup frequency, using the multiple access protocol, unless or until an acknowledgment is received from the receiver node, and (g) performing an exponential backoff and subsequent transmission of the message, by the sender node, if an acknowledgement is still not received from the receiver node after performing steps (a) through (f).

Another exemplary embodiment and/or exemplary method of the present invention is directed to a method for transmitting data from a sender node from among at least one sender node to a receiver node in a wireless network, in which the multiple access protocol includes the Carrier Sense Multiple Access (CSMA) protocol.

Yet another exemplary embodiment and/or exemplary method of the present invention is directed to a method for transmitting data from a sender node from among at least one sender node to a receiver node in a wireless network, in which the at least one sender node and receiver node are synchronized according to the Time Division Multiple Access (TDMA) protocol.

Still another exemplary embodiment and/or exemplary method of the present invention is directed to a method for transmitting data from a sender node from among at least one sender node to a receiver node in a wireless network, in which the message is transmitted in step (c) upon an occurrence of an event.

Yet another exemplary embodiment and/or exemplary method of the present invention is directed to a method for transmitting data from a sender node from among at least one sender node to a receiver node in a wireless network, in which the event includes an alarm.

Still another exemplary embodiment and/or exemplary method of the present invention is directed to a method for transmitting data from a sender node from among at least one sender node to a receiver node in a wireless network, in which step (g) further includes choosing, by the sender node, a random number, and transmitting the message in a time slot based on the chosen random number.

Yet another exemplary embodiment and/or exemplary method of the present invention is directed to a method for transmitting data from a sender node from among at least one sender node to a receiver node in a wireless network, in which a range of random numbers to choose from depends on a number of at least one of available time slots and available frequencies.

Still another exemplary embodiment and/or exemplary method of the present invention is directed to a method for transmitting data from a sender node from among at least one sender node to a receiver node in a wireless network, in which the number of available time slots is adjusted based on a number of failed transmission attempts.

Yet another exemplary embodiment and/or exemplary method of the present invention is directed to a method for transmitting data from a sender node from among at least one sender node to a receiver node in a wireless network, in which for every failed transmission attempt, the number of available time slots is increased by a factor of two.

An exemplary embodiment and/or exemplary method for transmitting data from a sender node from among at least one sender node to a receiver node in a wireless network, the method including (a) sampling, by the receiver node, in each time slot, a main network frequency and at least one backup frequency, (b) transmitting, by the sender node, a message on the main network frequency in a first time slot, without using a Carrier Sense Multiple Access (CSMA) protocol, (c) transmitting, by the sender node, the message on the main network frequency in a next time slot, using the Carrier Sense Multiple Access (CSMA) protocol, if an acknowledgement of the message is not received from the receiver node, (d) transmitting, by the sender node, the message on at least one backup frequency in the next time slot, using the Carrier Sense Multiple Access (CSMA) protocol, if the main network frequency is busy after performing step (c), (e) repeating steps (c) and (d) for a predefined number of time slots, unless or until an acknowledgement is received from the receiver node, (f) transmitting, by the sender node, the message on each backup frequency, using the multiple access protocol, unless or until an acknowledgment is received from the receiver node, and (g) performing an exponential backoff and subsequent transmission of the message, by the sender node, if an acknowledgement is still not received from the receiver node after performing steps (a) through (f), wherein the sender node chooses a random number and transmits the message in a time slot based on the chosen random number, a range of random numbers to choose from depends on a number of at least one of available time slots and available frequencies, wherein the number of available time slots is adjusted based on a number of failed transmission attempts and for every failed transmission attempt, the number of available time slots is increased by a factor of two.

Another exemplary embodiment and/or exemplary method for transmitting data from a sender node from among at least one sender node to a receiver node in a wireless network, in which the at least one sender node and receiver node are synchronized according to the Time Division Multiple Access (TDMA) protocol.

An exemplary embodiment and/or exemplary method for transmitting data from a sender node from among at least one sender node to a receiver node in a wireless network, in which the message is transmitted in step (c) upon an occurrence of an event.

An exemplary embodiment and/or exemplary method of the present invention is directed to method for transmitting data in a wireless network, the method comprising (a) sampling, in each time slot, at least one network frequency, (b) transmitting a message on a first network frequency in a first time slot, (c) transmitting the message on the first network frequency in a next time slot if an acknowledgement of the message is not received, (d) transmitting the message on at least one other network frequency in the next time slot if the first network frequency is busy after performing step (c), (e) repeating steps (c) and (d) for a predefined number of time slots, unless or until an acknowledgement of the message is received, (f) transmitting the message on each of the network frequencies, unless or until an acknowledgment of the message is received, and (g) performing an exponential backoff and subsequent transmission of the message if an acknowledgement of the message is still not received after performing steps (a) through (f).

An exemplary embodiment and/or exemplary method of the present invention is directed to method for transmitting data in a wireless network, the method including (a) transmitting a message on a first network frequency in a first time slot, (b) transmitting the message on the first network frequency in a next time slot if an acknowledgement of the message is not received, (c) transmitting the message on at least one other network frequency in the next time slot if the first network frequency is busy after performing step (c), (d) repeating steps (b) and (c) for a predefined number of time slots, unless or until an acknowledgement of the message is received, and (e) performing an exponential backoff and subsequent transmission of the message if an acknowledgement of the message is still not received after performing steps (a) through (d).

BRIEF DESCRIPTION OF THE DRAWINGS

FIG. 3 shows an exemplary calculation for a range of random numbers to choose from, which is a function of the number of attempts to transmit a message by the sender node in the wireless network.

DETAILED DESCRIPTION

Figure 1A:
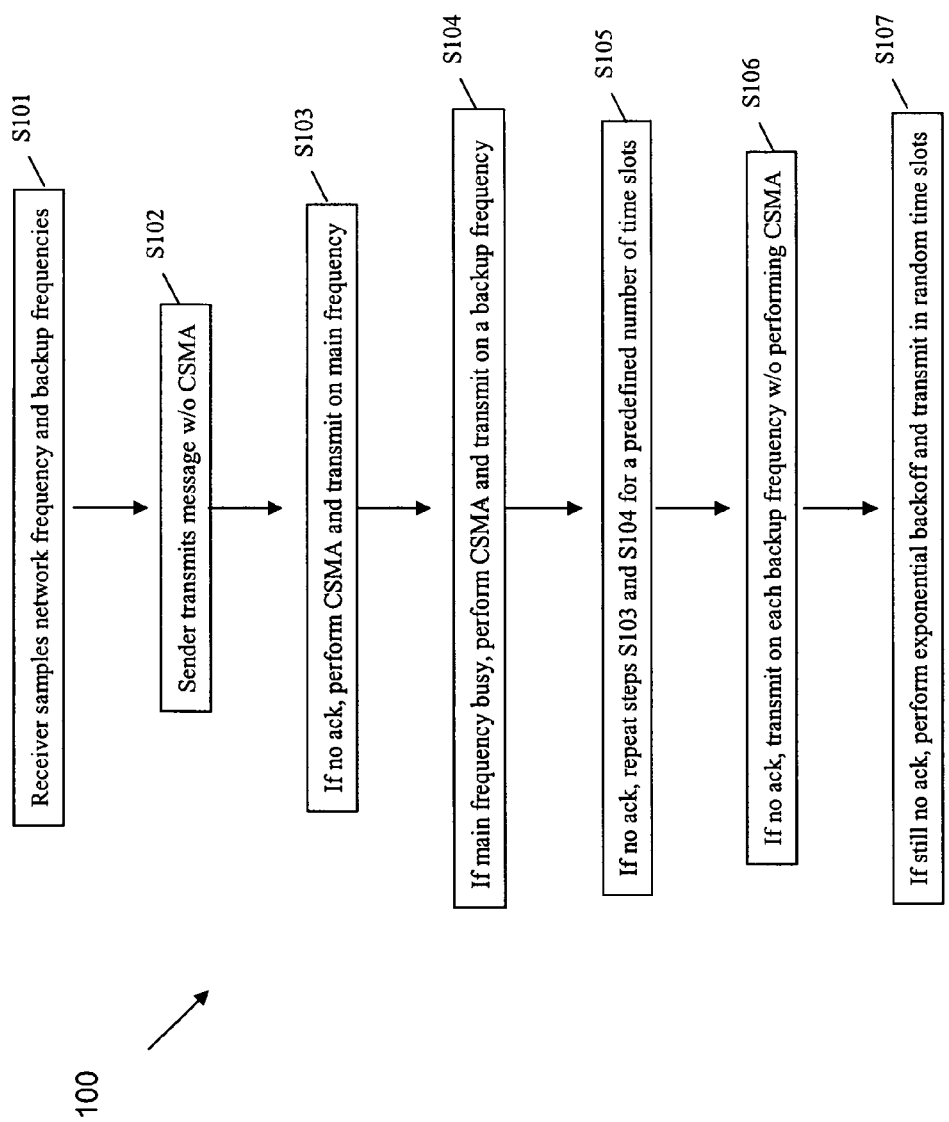
FIG. 1A shows an exemplary method for delivering a message from one or more sender nodes to a receiver node, in which a sender node attempts to transmit the message to the receiver node using acknowledgements, the Carrier Sense Multiple Access (CSMA) protocol and exponential backoff to ensure delivery of messages and reduced delay in wireless transmission.
Figure 1B:
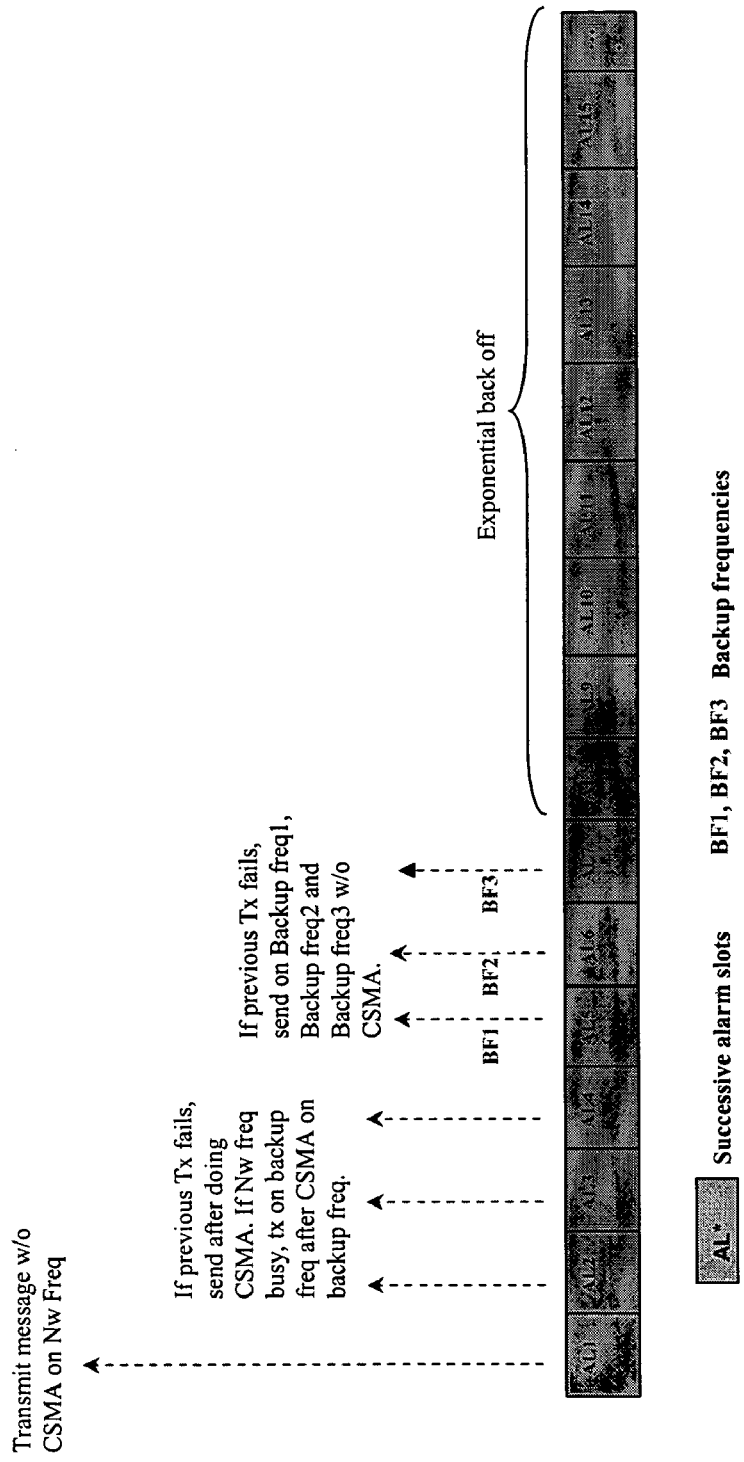
FIG. 1B shows in another representation the exemplary method of FIG. 1A.

FIGS. 1A and 1B show an exemplary method 100 for delivering a message from one or more sender nodes to a receiver node, in which a sender node attempts to transmit the message to the receiver node using acknowledgements, the Carrier Sense Multiple Access (CSMA) protocol and exponential backoff to ensure delivery of messages and reduced delay in wireless transmission. In this regard, it is assumed that the sender nodes do not have knowledge about another sender node's transmissions. It is also assumed that all the sender nodes are approximately time synchronized, in which time is divided into slots and the sender nodes transmit at the beginning of each time slot. It is further assumed that the nodes also use multiple frequencies, and that based on the channel qualities, the system chooses the best available channel as the main network frequency and the next best channels as one or more backup frequencies.

When sending messages, certain problems may occur. For example, if the link quality is poor (e.g., due to high level of noise) the messages may not reach the receiver node. Also, multiple sender nodes within a neighborhood (e.g., sender nodes within hearing range of one another) may simultaneously send messages to the receiver node resulting in a collision. Likewise, multiple distant sender nodes (e.g., sender nodes that cannot hear one another) may simultaneously send messages to the receiver resulting in a collision. Furthermore, a sender node due to some problem may not be synchronized with the network.

To account for these and other problems, the exemplary method 100 shown in FIG. 1 may be performed, for example, by a suitable processing arrangement. In particular, according to exemplary method 100, in step S101, in every time slot, the receiver node first samples the main network frequency and then samples the backup frequencies.

In step S102, upon the occurrence of an event, a message is generated at the sender node. The event may be, for example, the sensing of an alarm in a security network. The sender node transmits the message on the main network frequency in the first time slot following the event. In this regard, the message is transmitted without performing a Carrier Sense Multiple Access (CMSA) protocol exchange. If the receiver node receives the message, the receiver node sends an acknowledgement to the sender node at once or as soon as possible.

Figure 2B:
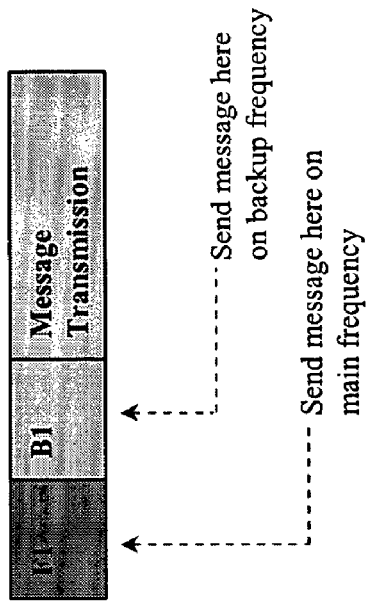
FIG. 2B shows an exemplary time slot allocation of one main network frequency and one backup frequency.
Figure 2A:
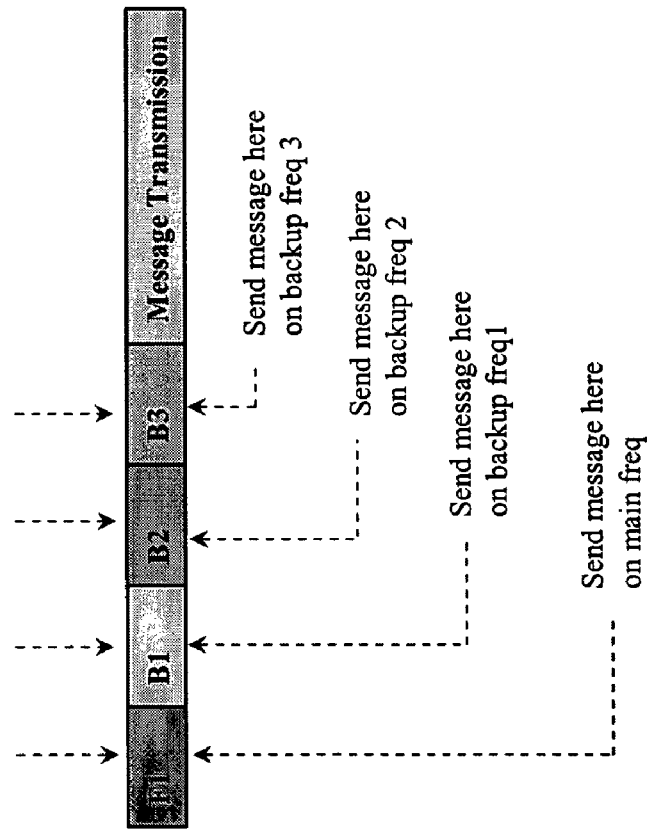
FIG. 2A shows an exemplary time slot allocation of one main network frequency and three backup frequencies.

In step S103, if the sender node does not receive an acknowledgement within a predefined period of time, the sender node performs a Carrier Sense Multiple Access (CSMA) protocol exchange on the main network frequency at the next time slot. If the sender node senses no signal, the sender node transmits the message on the main network frequency. Otherwise, in step S104 if the sender node senses a signal in the main network frequency, the sender node performs a Carrier Sense Multiple Access (CSMA) protocol exchange using one of the backup frequencies. If the channel is not busy, the sender node transmits the message on the backup frequency. This may be continued for multiple backup frequencies as shown, for example, in FIGS. 2A and 2B.

If no acknowledgement is received, in step S105, steps S103 and S104 are repeated for a predefined number of time slots to ensure that if events occur that affect multiple senders in a particular neighborhood, their messages may get through. Performing a Carrier Sense Multiple Access (CSMA) protocol exchange should help at least one of the messages to get through in a particular time slot.

If the message still does not get through, in step S106 the sender node advances to the next time slot and sends the message on a backup frequency without performing a Carrier Sense Multiple Access (CSMA) protocol exchange. If there are. multiple frequencies, the Carrier Sense Multiple Access (CSMA) protocol exchange is performed on all the backup frequencies in successive time slots if the messages do not get through. In this regard, sending messages on the backup frequency (or frequencies) handles the case where there is noise or interference on the main network frequency.

If the aforementioned steps do not result in messages getting through successfully, in step S107 the sender nodes perform an exponential backoff and transmit in random time slots. In particular, if the sender node still does not receive an acknowledgement of the message (may occur if the sender node's clock is not synchronized to the receiver node's clock), the sender node sends messages continuously for one time slot interval and these messages are separated by a wait time for acknowledgements. Since the receiver is alternately sampling the main network frequency and the backup frequency (or frequencies), the receiver node should be able to receive at least one message. Performing this step also handles the hidden terminal problem where distant senders transmit a message simultaneously and collide at the receiver.

Collision Avoidance Using Exponential Backoff

To avoid collision with one another, the sender node chooses a random number, and based on the random number chooses a time slot to transmit the messages. The sender node repeats this up to a maximum of six times. The range for the random number depends on the number of time slots available to choose from and the number of available frequencies to transmit including the backup frequencies. For every failed transmission, the sender node chooses from double the previous number of time slots. If there is one backup frequency, the sender node ensures that three messages are transmitted on the main network frequency and two messages are transmitted on the backup frequency, whereas for multiple network frequencies the sender node transmits two messages on the main network frequency and one message on each of the backup frequencies.

FIG. 3 shows an exemplary calculation for a range of random numbers to choose from, which is a function of the number of attempts to transmit a message by the sender node in the wireless network. In particular, FIG. 3 shows an iteration number corresponding to current transmission attempt, the number of time slots to choose from for each iteration, and the range of the random number for each iteration assuming the existence of one main network frequency and either three backup frequencies or one backup frequency. For example, if a sender node fails to receive an acknowledgement in iteration 1 and 2, and there are three backup frequencies, a random number is chosen from 1 to 32 during iteration 3. If the chosen number "rand_num" falls in the range 1 to 8, the sender node transmits in the time slot "rand_num" in the main network frequency. If the chosen number falls in the range 9 to 16, the sender node transmits the time slot "rand_num mod number_of_slots" in backup frequency 1. If the chosen number falls in the range 17 to 24, the sender node transmits in the time slot "rand_num mod number_of_slots" in backup frequency 2. If the chosen number falls in the range 25 to 32, the sender node transmits in the slot "rand_num mod number_of_slots" in backup frequency 3.

The number of transmissions on the main network frequency and backup frequency may be fixed by adjusting the range of the random number. For example, if the node performs transmissions 1, 2 and 4 on the main network frequency, the range of random numbers for the fifth iteration will be from 65 to 256.

The exemplary method may be extended to a more general case if it is repeated with different combinations of senders and receivers.

What is claimed is:

1. A method for transmitting data from a sender node from among at least one sender node to a receiver node in a wireless network, the method comprising:
   (a) sampling, by the receiver node, in each time slot, a main network frequency and at least one backup frequency;
   (b) transmitting, by the sender node, a message on the main network frequency in a first time slot, without using a multiple access protocol;
   (c) transmitting, by the sender node, the message on the main network frequency in a next time slot, using the multiple access protocol exchange, if an acknowledgement of the message is not received from the receiver node;
   (d) transmitting, by the sender node, the message on at least one backup frequency in the next time slot, using a multiple access protocol, if the main network frequency is busy after performing step (c);
   (e) repeating steps (c) and (d) for a predefined number of time slots, unless or until an acknowledgement is received from the receiver node;
   (f) transmitting, by the sender node, the message on each backup frequency, using the multiple access protocol, unless or until an acknowledgment is received from the receiver node; and
   (g) performing an exponential backoff and subsequent transmission of the message, by the sender node, if an acknowledgement is still not received from the receiver node after performing steps (a) through (f).

2. The method of claim 1, wherein the multiple access protocol includes the Carrier Sense Multiple Access (CSMA) protocol.

3. The method of claim 1, wherein the at least one sender node and receiver node are synchronized according to the Time Division Multiple Access (TDMA) protocol.

4. The method of claim 1, wherein the message is transmitted in step (c) upon an occurrence of an event.

5. The method of claim 4, wherein the event includes an alarm.

6. The method of claim 1, wherein step (g) further includes:
   choosing, by the sender node, a random number; and
   transmitting the message in a time slot based on the chosen random number.

7. The method of claim 1, wherein a range of random numbers to choose from depends on a number of at least one of available time slots and available frequencies.

8. The method of claim 7, wherein the number of available time slots is adjusted based on a number of failed transmission attempts.

9. The method of claim 8, wherein for every failed transmission attempt, the number of available time slots is increased by a factor of two.

10. A method for transmitting data from a sender node from among at least one sender node to a receiver node in a wireless network, the method comprising:
    (a) sampling, by the receiver node, in each time slot, a main network frequency and at least one backup frequency;
    (b) transmitting, by the sender node, a message on the main network frequency in a first time slot, without using a Carrier Sense Multiple Access (CSMA) protocol;
    (c) transmitting, by the sender node, the message on the main network frequency in a next time slot, using the Carrier Sense Multiple Access (CSMA) protocol, if an acknowledgement of the message is not received from the receiver node;
    (d) transmitting, by the sender node, the message on at least one backup frequency in the next time slot, using the Carrier Sense Multiple Access (CSMA) protocol, if the main network frequency is busy after performing step (c);
    (e) repeating steps (c) and (d) for a predefined number of time slots, unless or until an acknowledgement is received from the receiver node;
    (f) transmitting, by the sender node, the message on each backup frequency, using the multiple access protocol, unless or until an acknowledgment is received from the receiver node; and
    (g) performing an exponential backoff and subsequent transmission of the message, by the sender node, if an acknowledgement is still not received from the receiver node after performing steps (a) through (f), wherein the sender node chooses a random number and transmits the message in a time slot based on the chosen random number, a range of random numbers to choose from depends on a number of at least one of available time slots and available frequencies,
    wherein the number of available time slots is adjusted based on a number of failed transmission attempts and for every failed transmission attempt, the number of available time slots is increased by a factor of two.

11. The method of claim 1, wherein the at least one sender node and receiver node are synchronized according to the Time Division Multiple Access (TDMA) protocol.

12. The method of claim 1, wherein the message is transmitted in step (c) upon an occurrence of an event.

13. A method for transmitting data in a wireless network, the method comprising:
    (a) sampling, in each time slot, at least one network frequency;

(b) transmitting a message on a first network frequency in a first time slot;
(c) transmitting the message on the first network frequency in a next time slot if an acknowledgement of the message is not received;
(d) transmitting the message on at least one other network frequency in the next time slot if the first network frequency is busy after performing step (c);
(e) repeating steps (c) and (d) for a predefined number of time slots, unless or until an acknowledgement of the message is received;
(f) transmitting the message on each of the network frequencies, unless or until an acknowledgment of the message is received; and
(g) performing an exponential backoff and subsequent transmission of the message if an acknowledgement of the message is still not received after performing steps (a) through (f).

14. A method for transmitting data in a wireless network, the method comprising:
(a) transmitting a message on a first network frequency in a first time slot;
(b) transmitting the message on the first network frequency in a next time slot if an acknowledgement of the message is not received;
(c) transmitting the message on at least one other network frequency in the next time slot if the first network frequency is busy after performing step (b);
(d) repeating steps (b) and (c) for a predefined number of time slots, unless or until an acknowledgement of the message is received; and
(e) performing an exponential backoff and subsequent transmission of the message if an acknowledgement of the message is still not received after performing steps (a) through (d).

* * * * *

UNITED STATES PATENT AND TRADEMARK OFFICE
CERTIFICATE OF CORRECTION

PATENT NO.       : 7,613,146 B2
APPLICATION NO.  : 11/239836
DATED            : November 3, 2009
INVENTOR(S)      : Manjeshwar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Nineteenth Day of October, 2010

David J. Kappos
*Director of the United States Patent and Trademark Office*